Jan. 24, 1961   G. R. PIPES   2,969,081
DRAIN VALVES

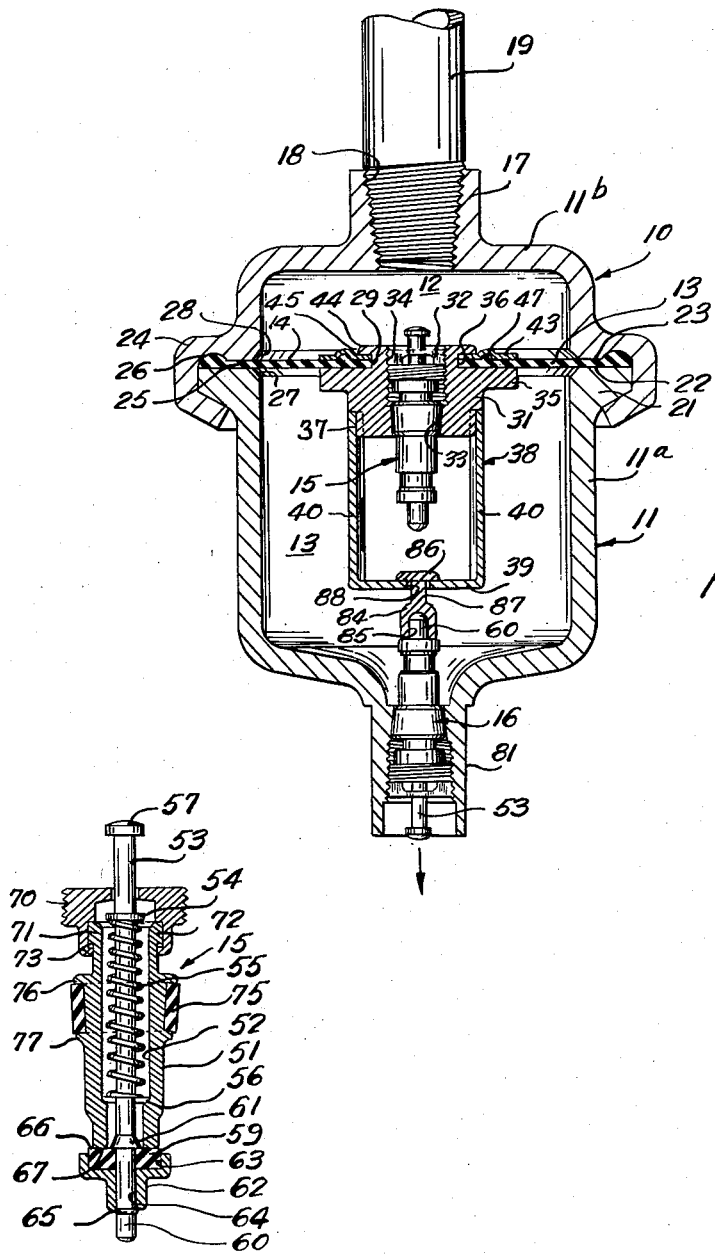

Filed June 23, 1958   3 Sheets-Sheet 2

INVENTOR.
GEORGE R. PIPES
BY Hudson, Boughton,
Williams, David & Hoffmann
ATTORNEYS Jan. 24, 1961    G. R. PIPES    2,969,081
DRAIN VALVES Filed June 23, 1958    3 Sheets-Sheet 3

INVENTOR.
GEORGE R. PIPES
BY Hudson, Boughton,
Williams, David & Hoffmann
ATTORNEYS United States Patent Office 2,969,081
Patented Jan. 24, 1961

2,969,081

DRAIN VALVES

George R. Pipes, South Euclid, Ohio, assignor to Eaton Manufacturing Company, Cleveland, Ohio, a corporation of Ohio Filed June 23, 1958, Ser. No. 743,620

7 Claims. (Cl. 137—204)

The present invention relates in general to drain valves and more particularly to drain valve devices for automatically draining liquid, such as water or oil, from compressed air systems. The drain valves of this invention are applicable to various air pressure systems including those used on automotive vehicles.

One of the principal objects of the present invention is to provide a novel drain valve for draining liquid from an air pressure system without loss of air pressure from the system and which drain valve is automatically operable in response to pressure fluctuations occurring in the system.

Another object is to provide such an automatically functioning drain valve as set forth in the preceding object which is also adapted for use in introducing or charging pressurized air into the system.

Still another object is to provide an automatic drain valve for an air pressure system or the like and which embodies control valve means operated by a pressure differential responsive means.

Another object of the present invention is to provide a novel automatic drain valve of simple configuration and a minimum number of parts, which drain valve is operatively responsive to an unbalance of pressure in one chamber of the drain valve as against another chamber of the drain valve so that condensate admitted from the system into the one chamber of the drain valve is automatically released to the atmosphere or to a sump.

Another object of the present invention is to provide an automatic drain valve having two valves including a check valve therein for releasing condensate from a pressure fluid system to the atmosphere or to a sump.

Another object of the present invention is to provide an automatic drain valve as set forth in the preceding object wherein the check valve is opened by differential pressure of a predetermined value thereacross and the other valve is responsive to a differential pressure across the check valve.

Another object of the present invention is to provide a new automatic drain valve of a simple and efficient operation where the structure thereof is economical to manufacture and comprised of a minimum number of parts which include valves of the automotive tire type.

The invention further resides in certain novel features of construction, combinations and arrangements of parts, and further objects and advantages of the invention will be apparent to those skilled in the art to which it pertains from the following description of the present preferred embodiments thereof described with reference to the accompanying drawings forming a part of this specification and wherein the same reference characters represent corresponding parts throughout the several views and in which:

Fig. 1 is a sectional view through the central, vertical axis of one embodiment of the present invention;

Fig. 2 is an axial sectional view on an enlarged scale taken through a tire-type valve used in the present invention;

Figure 3:
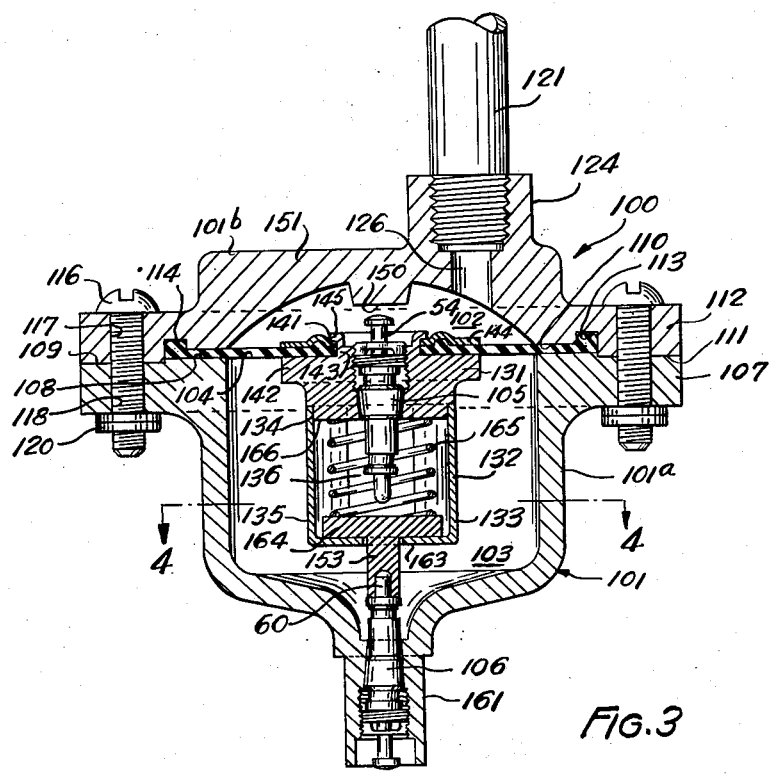
Fig. 3 is a vertical axial sectional view of a modification of the present invention.

It is to be understood that the invention is not limited to the details of construction and arrangements of parts shown in the drawing and hereinafter described in detail, but is capable of being otherwise embodied and of being practiced and carried out in various ways. It is to be further understood that the phraseology or terminology employed herein is for the purpose of description and there is no intention to herein limit the invention beyond the requirements of the prior art.

Referring to Fig. 1, one embodiment of the present invention, indicated generally by the reference numeral 10 comprises, in general, a housing 11 having the space therein divided into an upper, receiving chamber 12 and a lower, exhaust chamber 13 by a pressure differential responsive means here shown as a flexible diaphragm 14, and a plurality of control valves, in this case, two such control valves 15 and 16.

The housing 11 is comprised of a cup-shaped lower housing member 11a and a complementary cup-shaped upper housing member 11b of somewhat shallower construction secured together with the flexible diaphragm 14 sandwiched between the two so as to partition the automatic drain valve 10 and form the inlet chamber 12 and the exhaust chamber 13. The upper housing member 11b is provided with an upstanding hub portion 17 which is internally threaded as indicated at 18. An inlet pipe 19 is threaded into the hub 17 of upper housing member 11b and is representative of the air pressure system with which the drain valve 10 is connected.

The lower housing member 11a is provided with an annular and radially outwardly extending flange 21, an upper end face 22 of the housing member 11a being substantially flat and lying in a plane normal to the vertical axis of the housing of drain valve 10. The upper housing member 11b is provided with a flat annular face 22 which is substantially normal to the vertical axis of drain valve 10, as seen in Fig. 1. The upper housing member 11b is also provided with an outwardly extending radial flange 24 integrally connected adjacent the lower end face 23 thereof and adapted to be spun over so as to clasp the radial flange 21 of lower housing member 11a and draw the two end faces 22 and 23 together and sealingly engage an annular portion 25 of the flexible diaphragm 14 which is sandwiched therebetween.

The flexible diaphragm 14 can be of any suitable material such as an elastomer material which may comprise natural rubber, as well as synthetic materials having properties akin to natural rubber. It is also contemplated that the flexible diaphragm 14 can be of any suitable nonmetallic material, as well as any suitable metallic material or a composite of metallic and nonmetallic materials.

The annular spun-over flange 24 of the upper housing member 11b is provided with an internal annular recess 26 of semicircular cross-section in juxtaposition with the annular planar face 23 of the member 12, so as to provide an overflow space for material of flexible diaphragm 14 extruded because of the pressure with which the lower housing member 11a and upper housing member 11b have been clamped together. An additional benefit received because of the extrusion of the material of diaphragm 25 is that a hermetic seal between the members 11a and 11b across the diaphragm 14 is more assured. On the inner peripheral edges of flanges 21 and 24 a pair of substantially 45° bevels 27 and 28, respectively, are provided for supplying additional space for the diaphragm 14 to flex in an upward or downward direction.

The diaphragm 14, comprised primarily of the annular disk-like body portion 25, is formed with a central opening or passageway 29 for having a valve sleeve 31 secured therein. The substantially cylindrical valve sleeve 31 has a central passage 32 with the lower end thereof formed so as to provide a substantially frusto-conical opening or seat 33 with the upper part of the passage 32 being provided with threads 34.

The valve sleeve 31, in addition, comprises a centrally formed and radially extending annular shoulder 35, a neck portion 36 centrally formed at the upper end and connected with shoulder 35 of the valve sleeve 31 and a reduced lower end portion 37 of cylindrical configuration. A pendant cage 38, having a bottom portion 39 and a pair of opposed vertically extending side panels 40 of arcuate cross section, is rigidly secured to the reduced lower cylindrical end portion 37 of the sleeve 31 in a conventional manner, such as by brazing.

The neck portion 36 of sleeve 31 is inserted through the opening 29 of the flexible diaphragm 14, substantially as shown. A washer member 43 is slipped over the neck portion 36 of sleeve member 31 and an upper end 44 of the neck portion 36 is spun over so as to form a substantially radially extending annular flange 45 and secure the cage member 38 and washer 43 in assembly with diaphragm 14. The pendant cage 38 is thereby resiliently suspended within the automatic drain valve 10 by means of the resilient and flexible diaphragm 14.

The washer 43 is provided with an annular recess 47 of substantially semi-circular cross-section for receiving the extruded excess of the flexible diaphragm 14 therein and to assure a hermetic seal between the washer 43 and the diaphragm 14.

The valve 15 is a transfer valve of the automotive tire type, Figures 1 and 2, and is comprised of a sleeve-like valve stem body 51 having a central opening or liquid transfer passage 52 for receiving a valve actuating stem 53 therethrough. Valve actuating stem 53 is provided, adjacent the upper end thereof, with a radial flange 54 for seating one end of a helical spring 55, the other end of the helical spring 55 being seated against an internal annular shoulder 56 in the valve stem body 51. The aforedescribed arrangement loads the valve actuating stem 53 in such a manner that upon pressing a button head 57 of the valve stem 53 in a downward direction, the spring 55 will resiliently resist the pressing action and tend to urge the valve stem 53 vertically upward and maintain the same in a vertically outwardly extended position.

A substantially flat annular seal or valve 59, preferably of a nonmetallic elastic material, is telescoped over a terminal end 60 of valve stem 53 opposite to button head 57, and in axial abutment with a frusto-conical abutment 61 integrally connected with the valve stem 53. A valve seal retainer 62 having a cylindrical recess 63 formed in the upper end thereof is provided with a central opening 64 for permitting the retainer 62 to be slipped over the terminal end 6" of the valve stem 53 and retained in place with the seal 59 in contact with the abutment 61 in an appropriate manner, for example, by means of a shoulder ring 65 formed near the end 60 of the valve stem 53.

An upper face 66 of the seal 59 is adapted to abut a substantially coplanar lower terminal end 67 of valve stem body 51 in such a manner that when the button head 57 of valve stem 53 is in its outermost position under the resilient biasing action of the helical spring 55, the seal 59 sealingly engages the lower terminal face 67 of valve stem body 51.

Transfer valve 15 is adapted to be threaded into the valve sleeve 31 by means of an externally threaded attachment 70 secured to an upper terminal end 71 of valve stem body 51, which end 71 is provided with a radial shoulder portion 72, by spinning over a downwardly extending annular skirt 73, integrally formed with externally threaded attachment 70, so as to enclose the shoulder 72 and thereby prevent the separation of valve stem body 51 from threaded attachment 70. The shoulder 72 of valve stem body 51 is free to move axially within the spun-over depending skirt portion 73 of threaded attachment 70 for a limited distance.

The transfer valve 15, by means of the threaded attachment 70, is permitted to be threaded into the correspondingly threaded portion 34 of valve sleeve 31 until an annular frusto-conical nonmetallic seal 75 attached to the mid-portion of valve stem body 51 is pressed into hermetically sealed relationship with the frusto-conical seat 33 in valve sleeve 31. The seal 75 is accordingly tightly secured to the mid-portion of valve stem body 51 by means of a pair of radially extending retaining flanges 76 and 77 formed thereon.

The self closing valve 16, substantially identical to the valve 15, but disposed in inverted position, is threaded into a depending central hub portion 81 of lower housing member 11, so as to form a seal therebetween in the same manner that the valve 15 is sealingly seated within the valve sleeve 31. The self closing valve 16 controls the passage of condensate or other liquid, such as oil, therethrough from the exhaust chamber 13, preferably to a sump, not shown. However, should there only be condensate in the system to be disposed of, the drain valve may exhaust liquid to the atmosphere, as desired.

The pendant cage 38 is bifurcated and thereby formed with a pair of longitudinal side openings formed by the side panels 40 so as to permit the escape of condensate or other liquid, which has passed through the check valve 15 into the interior of cage 38, outwardly through the side openings to the exterior side of the cage 38, but within the exhaust chamber 13.

Another feature of the present invention is that the valve 16 is actuated open by pulling the valve stem 53 upwardly so as to permit passage of liquid through the valve when the diaphragm is flexed upwardly. The foregoing is carried out by connecting the terminal end 60 of the valve stem 53 to the bottom 39 of the cage 38. This is accomplished by using an interconnecting button head sleeve 84 having a cylindrical recess 85 in the lower end thereof and a round button head 86 on the upper end thereof. The sleeve recess 85 receives the end 60 of the valve stem 53 and the sleeve is crimped thereto. The button head sleeve 84, which may also be referred to as a valve core adapter, has a neck portion 87 loosely disposed in a cross-slot 88 in the bottom 39 of the cage 38. The upper end of neck portion 87 is flattened so as to form a button head 86 and thereby secure the valve stem 53 to the pendant cage 38 for limited up and down movement. This lost motion connection between cage 33 and sleeve 84 permits the diaphragm 13 to be flexed downwardly a short distance without placing undue strains on valve 16 before valve 15 is opened, but the upward flexure of diaphragm 13 will cause the cage 38 to engage the button head 86 and urge valve 16 open.

The inlet chamber 12 is dimensionally a low point in the air pressure system for permitting condensate and other undesirable liquid to gravitate thereto. The outlet or exhaust chamber 13 can also be referred to as an oil and/or condensate collection chamber. The direction of liquid flow is from inlet chamber 12 to exhaust chamber 13 via transfer passage 52 in transfer valve 15 when an air pressure differential of approximately two pounds, for example, is exceeded across the flexible diaphragm 14. Since the drain valve 16 remains closed when the transfer valve 15 is open, the liquid flow is only from upper chamber 12 to lower chamber 13 and substantially no air pressure will be lost from the air pressure system except the quantity necessary to raise the pressure in the exhaust chamber 13 sufficiently to close transfer valve 15. As between the exhaust chamber 13 and the return line 81 to the atmosphere or sump, not shown, the direction of liquid flow to the transfer valve 15 is from exhaust chamber 13 to the atmosphere or sump.

Initially, liquid is deposited in chamber 12 and is carried through transfer valve 15 along with a small quantity of pressurized air to exhaust chamber 13 when the pressure differential in chamber 12 is approximately two pounds greater than in chamber 13. A subsequent drop of pressure in chamber 12 causes an unbalance of pressure between chambers 12 and 13, whereby the diaphragm 14 will be deflected upwardly and urge open drain valve 16, thus allowing liquid to be carried into return line 81 to the sump. When the pressure in exhaust chamber 13 drops to a pressure substantially equivalent to or less than that in the chamber 12, the drain valve 16 will close and one cycle of the automatic drain valve is completed.

Figure 4:
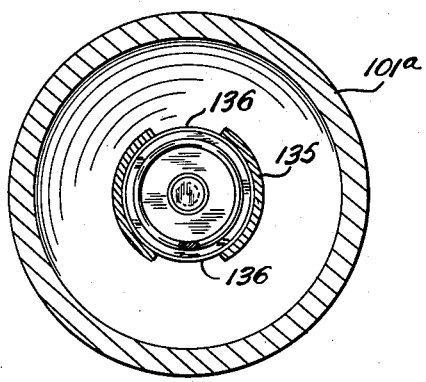
Fig. 4 is a transverse section taken on section line 4—4 of Fig. 3.

Referring to Figures 3 and 4, a second modification of the present invention, indicated generally by numeral 100, comprises a two-part housing 101 consisting of a generally cup-shaped lower housing member 101a and a shallower cup-shaped upper housing member 101b, the housing 101 having the space therein partitioned into an upper inlet or receiving chamber 102 and a lower exhaust or outlet chamber 103 by a pressure differential responsive means shown as a flexible diaphragm 104 and a plurality of control valves, in this case two such control valves 105 and 106.

The lower housing member 101a at the upper end thereof is provided with an outwardly extending flange 107 having an annular flat face 108 and a stepped-down flat, annular bearing surface 109.

The upper housing member 101b is provided with a flat, annular sealing face 110 and a radially extending flat and annular bearing face 111 in a radially outwardly extending, annular flange 112 with an annular groove 113 of substantially rectangular cross-section disposed between the flat sealing face 110 and the stepped-up flat bearing face 111.

The substantially flat, annular and flexible diaphragm 104 is sandwiched between the lower housing member 101a and the upper housing member 101b and is provided with a peripherally extending annular bead 114 disposed in groove 113. A plurality of screws 116 are passed through corresponding axially extending and equiangularly spaced holes 117 and 118 in the flange 112 of upper housing member 101b and flange 107 of lower housing member 101a, respectively. Suitable fastening means, such as nuts 120 are threaded onto screws 116 for fastening the flexible diaphragm 104 between the flanges 112 and 107.

A fluid pressure line 121, representative of an air pressure system, is threaded into an eccentrically formed embossment 124 integrally formed in upper housing member 101b and connects with the inlet chamber 102 formed by the flexible diaphragm 104 with the cup-shaped upper housing member 101b by means of a cylindrical bore 126.

A liquid transfer valve 105, and more particularly a check valve, is threaded into and securely seated within a modified valve sleeve 131 substantially as described in the embodiment of Figures 1 and 2. A pendant cage 132, comprised of a substantially cylindrical sleeve portion 133 is braised to a depending end 134 of the valve sleeve 131. A cylindrical wall 135 of the cylindrical sleeve 133 is longitudinally slotted so as to form a pair of diametrically opposite slots 136 for permitting condensate to pass from inside of cage 132 to the exterior thereof into the lower housing member 101a.

The valve sleeve 131 and pendant cage 132 form a depending valve supporting structure and are connected to the flexible diaphragm 104 in a manner substantially similar to that described in connection with Figures 1 and 2. More particularly, the valve sleeve 131 is provided with a neck portion 141 which terminates at its lower end in a broad, radially extending, annular shoulder 142, which neck portion extends through a central opening 143 in the flexible diaphragm 104. A washer 144, similar to washer 43, is disposed over the neck portion 141 of valve sleeve 131 and the upper terminal end of the neck portion 141 is flattened or spun over so as to form a radial shoulder 145 and thereby retain the washer 144 and the valve sleeve 131 in assembly with the flexible diaphragm 104.

The transfer valve 105, sealingly secured within the valve sleeve 131, has its button head on the valve stem 54 adapted to be spaced a small rectilinear dimension below a downwardly projecting valve actuating abutment 150 integrally connected with and formed in a transverse wall portion 151 of upper housing member 101b.

A modified button head sleeve 153, somewhat similar to the button head sleeve 84, is crimped onto the valve stem end 60 of the drain valve 106 threadedly disposed in a downwardly depending central embossment 161 of the lower housing member 101a. The sleeve portion of the button head sleeve or valve core adapter 153 is slidably disposed in a bottom panel 163 of a pendant sleeve 132 with a flat, round head 164 of the valve core adapter 153 normally seated against the bottom panel 163 of the pendant sleeve 132. A helical spring 165 has an upper end abutting against a bottom face 166 of the valve sleeve 131 and a lower end biased against the juxtaposed upper face of head 164 for biasing the panel 163 of pendant sleeve 132 upwardly against the bottom side of head 164. This lost motion connection between cage 132 and adapter 153 permits the diaphragm 104 to be flexed downwardly a short distance without placing undue stresses on valve 106 before valve 105 is opened, but the upward flexure of diaphragm 104 will cause cage 132 to engage the underside of the head 164 and urge valve 105 open. This feature prevents possible damage to the seal 59 in valve 106. Moreover, the spring 165 cushions, and resiliently damps the downward deflection of the diaphragm 104. The valve closing spring of drain valve 106, similar to the valve closing spring 55 in valve 15 of Fig. 2, resists upward deflection of the diaphragm 104.

Condensate and/or oil flows through pressure line 121 into the inlet chamber 102 and upon the occurrence of a pressure differential of, for example, substantially two pounds between the inlet chamber 102 and the exhaust chamber 103, the valve 105 opens so that the liquid comprised of condensate and/or oil will flow therethrough to exhaust chamber 103. Should the exhaust chamber 103 be used in an air pressure system in which leakage of hydraulic fluid might occur, the chamber 103 can be referred to as an oil collection chamber.

Once the pressure in the exhaust chamber 103 exceeds a predetermined pressure differential relative to the inlet chamber 102, the flexible diaphragm 104 is flexed upwardly, causing valve 106 to open so that the liquid in chamber 103, such as condensate and/or oil is passed through valve 106 to the atmosphere or a sump. However, when the diaphragm 104 flexes upwardly sufficiently to open the valve 106 and drain the exhaust chamber 103, the upward deflection of the diaphragm 104 is not sufficient to open the transfer valve 105 by causing its valve stem 53 to abut against stop or abutment 150.

Depending upon the spacing between the capped head of the valve stem 54 in the transfer valve 105 and the abutment 150 formed in the housing 101, the transfer valve 105 will be opened when the valve stem 54 abuts against abutment 150 upon the diaphragm 104 being flexed upwardly a predetermined distance.

It is also another important feature of the present embodiment that an external source of pressurized air can be connected to the embossment 161 of lower housing member 101b for charging the air pressure system 121 via the automatic drain valve 100. The valve stem 53 of the drain valve 106 is depressed similar to a tire valve, and the lower chamber 103 is charged with pressurized air until the diaphragm 104 is caused to be flexed upwardly and the button head of valve stem 54 is biased against the stop 150 and the transfer valve 105 is opened, at which instant pressurized air is forced into the upper chamber 102, and pipe 121 of the air pressure system. This feature is especially advantageous in a pneumatic suspension system for motor vehicles when the compressor has failed and it is desired to charge the air pressure system and, more particularly, the suspension system, for emergency purposes.

A third embodiment of the present invention is shown in Figures 5 to 8 and is indicated generally by the reference numeral 200. The automatic drain valve 200 is comprised of a two-part housing 201 consisting of a lower housing member 201a and an upper housing member 201b with complementary flange portions secured together by conventional means such as stud bolts 202 and therebetween sandwiching pressure responsive means such as a flexible diaphragm 203. The flexible diaphragm 203 and a plurality of control valves, such as control valves 204 and 205 divides the housing 201 into an upper, inlet chamber 206 and a lower exhaust chamber 207. The upper housing member 201b is substantially cup-shaped and comprised of a central transverse wall 208 of circular configuration with an axially upwardly extending, eccentrically disposed, internally threaded embossment 209 formed integrally with the upper transverse wall 208. An internal passageway 210 communicates with the internally threaded embossment 209 and the inlet chamber 206. An inlet pipe 216, representative of an air pressure system, is threaded into the embossment 209 for forming a connection with the passage 210, and inlet chamber 206.

The lower housing member 201a, forming the exhaust chamber 207, is comprised of a cup-shaped and substantially cylindrical wall portion 218 having a substantially conical bottom wall 219 and a depending, internally threaded embossment 220, integrally formed with the central portion of bottom wall 219.

The annular, flexible diaphragm 203 having an outer peripheral bead-like edge 221 is sandwiched between an annular sealing face 222 of a flange 223 of upper housing member 201b and a sealing face 224 of a flange 225 of lower housing member 201a, with the peripheral edge 221 being disposed within a groove 226 and clamped therebetween by means of the stud bolts 202 passed through holes 227 of flange 223 and threaded into threaded holes 228 of the flange 225. The groove 226 serves the additional function of receiving extruded material of diaphragm 203. The extrusion is caused by compressing the diaphragm 203 between the upper housing member 201b and lower housing member 201a when the stud bolts 202 are tightened.

A valve sleeve 235 and a washer 236, similar to washers 144 and 43, are secured to the central portion of diaphragm 203 substantially in a manner previously described. Details of this connection may be had by referring to the description of Figures 3 and 4. Similarly, valve 204 is a transfer valve of the tire type, substantially identical to the transfer valves 15 and 105 of the preceding embodiments, secured within the valve sleeve 235. In addition, tire type valve 205, similar to the tire type valve 106, is secured within the internally threaded depending embossment 220 of the lower housing member 201a. Detailed description of valves 204 and 205 may be had by referring to the description of valve 15 in Figure 2 in connection with the first embodiment of the present invention.

The valve sleeve 235 is comprised of a substantially cylindrical depending portion 246, but with a substantially quadrangular, diametrically extending opening 247 formed by a pair of opposed inner walls 248 and 249 terminating at the upper end thereof in a perpendicular, transverse upper wall 250.

The terminal end 60 of the valve stem 53 of drain valve 205 has a button head sleeve 255 comprised of a disk-like head 256 and axially extending tubular portion 257, having a central opening 258, disposed thereover and crimped thereto in a conventional manner.

The valve core adapter or button head sleeve 255, securely connected to the valve stem 53 of the valve 205, is connected to the lower end of valve sleeve 235 by means of an over center snap spring 260.

The spring 260 is comprised of a substantially rectangular strap 261 of spring metal material having a symmetrically bowed cross-section and diametrically extending across the cylindrical wall 218 of lower housing member 201a with a pair of terminal ends 262 and 263 seated in arcuate groove segments 264 and 265, respectively, which are internally formed adjacent the lower wall 219 of the lower housing member 201a. The center of the over center snap spring 260 is formed with a circular aperture 266 of sufficient diametrical dimension to slidably receive the tubular portion 257 of button head sleeve 255 therein before the latter is crimped onto the end 60 of valve stem 53 in the drain valve 205.

The snap spring 260 is secured to the lower end of the cylindrical depending portion 246 of valve sleeve 235 by means of a pair of parallel and upwardly extending latch members 270 and 271 of substantially rectangular configuration and formed by punching or otherwise cutting the same out of the body of the snap spring 260 so as to leave a pair of similarly shaped rectangular openings 272 and 273, respectively. The upper ends of the latch members 270 and 271 are deflected perpendicularly inwardly so as to form a pair of catches 274 and 275 receivable in two substantially parallel, transverse grooves 276 and 277 of rectangular cross-section in the outer surface of depending portion 246. Normally, the spring 260 loosely embraces the sleeve 255 and the catches 274 and 275 are bottomed in grooves 276 and 277, respectively, Fig. 5. When the exhaust valve 205 is opened to drain chamber 207, the spring 260 bears against the underside of button head 256 and the catches 274 and 275 are urged against the upper sides of grooves 276 and 277, respectively, Fig. 7. Moreover, when the air pressure system is being charged via air valve 200, the spring 260 bears against the underside of button head 256 as well as against the upper sides of grooves 276 and 277, respectively, Fig. 8.

When the air pressure in inlet chamber 206 exceeds the air pressure in the exhaust chamber 207, the valve stem of valve 204 is caused to be depressed and liquid including condensate and/or oil is drained through valve 204 to the exhaust chamber 207. As soon as the air pressure in the exhaust chamber 207 rises sufficiently, the valve 204 will close and thus trap the liquid in the exhaust chamber 207.

Figure 5:
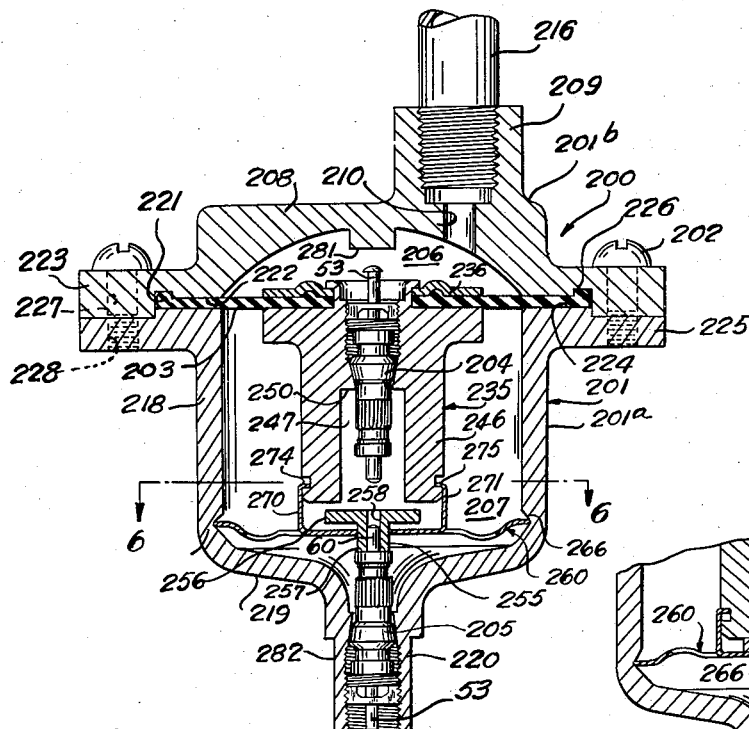
Fig. 5 is a vertical axial sectional view of a second embodiment of the present invention.
Figure 7:
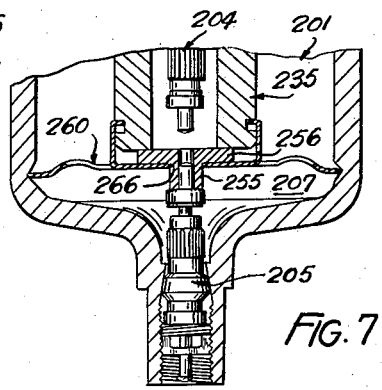
Fig. 7 is a fragmentary sectional view corresponding with a portion of Fig. 5 but with one of the valves of the device shown in a different operative position.
Figure 6:
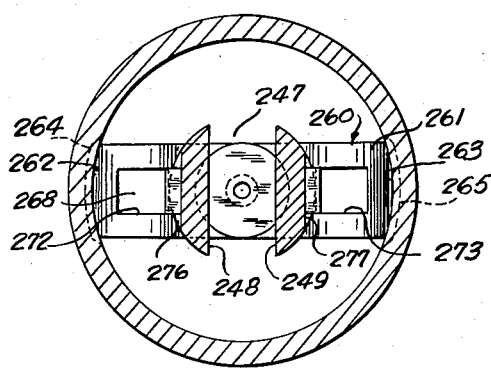
Fig. 6 is a transverse section taken on section line 6—6 of Fig. 5.

When the air pressure in the exhaust chamber 207 exceeds the air pressure in the inlet chamber 206 by a predetermined value, due to a pressure drop therein, the diaphragm 203 will be deflected upwardly, carrying with it valve sleeve 235 as well as the depending, connected over center snap ring 260 which moves from the position shown in Fig. 5 to that shown in Fig. 7 and thereby causing the snap spring 260 to engage the disk-like head 256 of valve core adapter 255 and biasing open the valve 205. However, the upward deflection of the diaphragm 203 will not be sufficient to cause the valve 204 to abut a stop 281 integrally and centrally formed in the transverse wall 208 of the upper housing member 201b and downwardly extending into the chamber 206, similar to the stop 150 in Fig. 3. Consequently, the transfer valve 204 will not be opened, and only the oil and/or liquid condensate in exhaust chamber 207 will be drained past drain valve 205 to a sump or the atmosphere.

Figure 8:
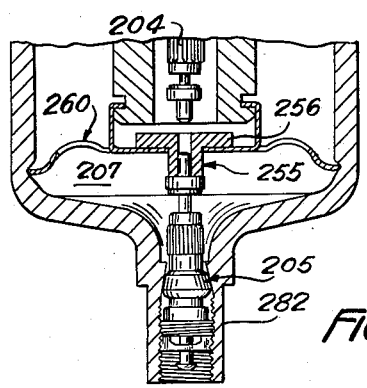
Fig. 8 is a view similar to Figure 7, but showing still another operative position of such valve.

An important feature of the present invention resides in the quick opening and closing of the valve 205 effected by the over center snap spring 260 deflecting upwardly into the position shown in Fig. 8 for quickly urging the drain valve 205 open.

The closing of drain valve 205 is effected when the diaphragm 203 and its depending valve sleeve 235 are urged downwardly a sufficient distance by a pressure unbalance between chambers 206 and 207 so that the central portion of the over center snap spring 260 is caused to snap downwardly for quickly releasing the valve core adapter 255 and permitting the drain valve 205 to be biased closed by the helical spring in the tire type drain valve. The drain valve 205 does not operate as a check valve as is apparent from the foregoing, but is a self closing valve as are the drain valves previously described.

Moreover, the instant embodiment of Figures 5 to 8 provides a lost motion feature wherein the diaphragm 203 can be flexed upwardly as well as downwardly slightly due to small variations of pressure differential between chambers 206 and 207, but a slight upward flexure thereof will not be sufficient to cause the opening of the exhaust valve 205 and the subsequent draining of chamber 207 since over center snap spring 260 will not be moved a sufficient distance to open the exhaust valve 205.

Another advantageous feature of the present embodiment resides in the fact that a pressurized air line, not shown, can be connected with the drain valve 205, preferably by slipping a hose over a cylindrical end 282 of the depending embossment 220 for charging the fluid pressure system via the automatic drain valve 200. The valve stem 53 of the drain valve 205 is pressed upwardly in a conventional manner and pressurized air is charged into the lower chamber 207 with the result that once the air pressure in the lower chamber 207 exceeds the pressure in the upper chamber 206 by a predetermined amount, the diaphragm 203 will be biased upwardly a sufficient distance for the stem 53 of the valve 204 to be pressed against the stop 281, whereby the valve 204 will be forced open for permitting pressurized air to pass therethrough into the upper chamber 206 and through the pipe 216 into the air pressure system. Once the air line is disconnected from valve 204 the self-closing valves 204 and 205 will automatically close.

While I have shown and described several embodiments in accordance with my invention, it is understood that the same are susceptible of many changes and modifications, as known to a person skilled in the art, and I intend to cover all such changes and modifications which come within the scope of the appended claims.

Having thus described my invention, I claim:

1. In an automatic drain valve for draining an air pressure system, a housing, flexible diaphragm means partitioning said housing and defining an inlet chamber and an exhaust chamber therein, cage means forming passage means in said flexible diaphragm means communicating with said inlet chamber and said exhaust chamber, first valve means controlling said passage means in said cage means, means forming exit means for draining liquid from said exhaust chamber, second valve means controlling said exit means, said cage means connecting said flexible diaphragm means to said second valve means for opening the same upon the flexure of said flexible diaphragm means in one direction when the pressure in said exhaust chamber exceeds the air pressure in said inlet chamber by a predetermined amount, and abutment means engageable by said first valve means for opening of the latter upon further flexing of said flexible diaphragm means in said one direction when the pressure in said exhaust chamber exceeds the air pressure in said inlet chamber by an amount greater than said predetermined amount.

2. In an automatic drain valve as set forth in claim 1, further comprising over center snap spring means connected with said cage means for aiding in effecting the quick opening of said second valve means.

3. In a valve device of the character described, a housing, a flexible diaphragm partitioning said housing into inlet and exhaust chambers, said housing defining an inlet and an outlet port communicating with said inlet chamber and said exhaust chamber respectively, said diaphragm being movable to positions corresponding to air pressure differentials between said chambers, valve sleeve means mounted on said diaphragm and defining a transfer passage therethrough communicating with said inlet chamber and with said exhaust chamber, a first valve controlling said transfer passage, a second valve controlling said outlet port, said diaphragm being connected to said second valve for opening thereof when the diaphragm is moved to one of said positions, and abutment means engageable by said first valve for opening thereof when said diaphragm is moved to another of said positions, said first valve being also operable by air pressure in said inlet chamber exceeding air pressure in said exhaust chamber by a predetermined amount.

4. In a valve device of the character described, a housing, a flexible diaphragm partitioning said housing into inlet and exhaust chambers, said housing defining an inlet and an outlet port communicating with said inlet chamber and said exhaust chamber respectively, said diaphragm being movable to positions corresponding to air pressure differentials between said chambers, valve support means mounted on said diaphragm and defining a transfer passage therethrough communicating with said inlet chamber and with said exhaust chamber, a first normally closed valve controlling said transfer passage and a second normally closed valve controlling said outlet port, lost motion connecting means connecting said diaphragm to said second valve for opening thereof when said diaphragm is moved to one of said positions, and abutment means in said housing engageable by said first valve for opening thereof when said diaphragm is moved to another of said positions, said first valve being also operable by air pressure in said inlet chamber exceeding air pressure in said exhaust chamber by a predetermined amount.

5. A valve device as defined in claim 4 and wherein said lost motion connecting means comprises a cage means supported from said diaphragm, a link member movably retained by said cage for limited relative movement with respect thereto, said link member being connected to said second valve, and spring means for controlling said relative movement.

6. A valve device as defined in claim 5 and wherein said spring means comprises a compression spring within said cage normally urging said cage and said link member in opposite directions.

7. A valve device as defined in claim 5 and wherein said spring means comprises an over center snap spring connected to said cage for alternately opposing and permitting said relative movement.

References Cited in the file of this patent

UNITED STATES PATENTS

| | | |
|---|---|---|
| 2,022,724 | Kudolla | Dec. 3, 1935 |
| 2,591,432 | Hoerner | Apr. 1, 1952 |
| 2,619,985 | Wilkerson | Dec. 2, 1952 |